(12) United States Patent
Li (10) Patent No.: US 12,026,826 B2
(45) Date of Patent: Jul. 2, 2024

(54) INFORMATION PROCESSING SYSTEM DISPLAYING IMAGES OF A MIXED REALITY SPACE

(71) Applicant: CANON KABUSHIKI KAISHA, Tokyo (JP)

(72) Inventor: Wenjing Li, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 17/819,588

(22) Filed: Aug. 12, 2022

(65) Prior Publication Data

US 2023/0054805 A1 Feb. 23, 2023

(30) Foreign Application Priority Data

Aug. 19, 2021 (JP) ................... 2021-133964

(51) Int. Cl.
*G06T 15/20* (2011.01)
*G06F 3/01* (2006.01)
*G06T 19/00* (2011.01)

(52) U.S. Cl.
CPC .............. *G06T 15/20* (2013.01); *G06F 3/011* (2013.01); *G06T 19/006* (2013.01); *G06T 2219/024* (2013.01)

(58) Field of Classification Search
CPC . G06T 15/20; G06T 19/006; G06T 2219/024; G06F 3/011
See application file for complete search history.

(56) References Cited

U.S. PATENT DOCUMENTS

| 11,651,555 | B2 * | 5/2023 | Energin | G06F 3/04815 |
| | | | | 345/633 |
| 2014/0368534 | A1 * | 12/2014 | Salter | G06F 3/012 |
| | | | | 345/619 |
| 2016/0263477 | A1 * | 9/2016 | Ladd | A63F 13/212 |

FOREIGN PATENT DOCUMENTS

| JP | 2017120650 A | 7/2017 |
| JP | 2020074066 A | 5/2020 |

* cited by examiner

*Primary Examiner* — Maurice L. McDowell, Jr.
*Assistant Examiner* — Donna J. Ricks
(74) *Attorney, Agent, or Firm* — Canon U.S.A., Inc., IP Division (57) ABSTRACT

An information processing apparatus includes at least one memory storing instructions and at least one processor that, upon execution of the instructions, is configured to operate as an instruction acquisition unit configured to acquire an instruction with respect to a virtual object in a mixed reality space from a user who is one of a plurality of users in the mixed reality space, a mode determination unit configured to determine, based on the acquired instruction, a display mode of the virtual object for another user in the mixed reality space, a viewpoint determination unit configured to determine, based on the determined display mode, a viewpoint with respect to the virtual object in the mixed reality space, and an image generation unit configured to generate an image of the mixed reality space including the virtual object viewed from the determined viewpoint.

18 Claims, 10 Drawing Sheets

INFORMATION PROCESSING SYSTEM DISPLAYING IMAGES OF A MIXED REALITY SPACE

BACKGROUND

Field

The present disclosure relates to an information processing technique for superimposing an image of a virtual object on an image of a real space.

Description of the Related Art

Mixed reality (hereinafter also referred to as MR) technology has become widespread in recent years. The MR technology can provide mixed reality to a user who wears a head mounted display (HMD) by displaying a superimposed image in which a virtual image generated by a computer is superimposed on an image of a real space captured by a camera of the HMD.

Japanese Patent Application Laid-Open No. 2017-120650 discusses a technique for presenting a virtual object displayed in a virtual space to users at a plurality of sites, in a direction in which another user views the virtual object. Japanese Patent Application Laid-Open No. 2020-74066 discusses a technique for enabling a user to share an MR space video image viewed by another user and further operate the MR space video image on the user's own terminal.

In a case where a plurality of users views a virtual object disposed in an MR space at the same time, it may be necessary for the users to move in a real space or for the users other than a specific user to move the viewpoint positions in a virtual space of the specific user. This is not practical.

SUMMARY

The present disclosure is directed to a technique for enabling a plurality of users to view a virtual object without positional movement in a real space or viewpoint position movement in a virtual space.

According to an aspect of the present disclosure, an information processing apparatus includes at least one memory storing instructions and at least one processor that, upon execution of the instructions, is configured to operate as an instruction acquisition unit configured to acquire an instruction with respect to a virtual object in a mixed reality space from a user who is one of a plurality of users in the mixed reality space, a mode determination unit configured to determine, based on the acquired instruction, a display mode of the virtual object for another user in the mixed reality space, a viewpoint determination unit configured to determine, based on the determined display mode, a viewpoint with respect to the virtual object in the mixed reality space, and an image generation unit configured to generate an image of the mixed reality space including the virtual object viewed from the determined viewpoint.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings. The exemplary embodiments described below are not intended to limit the present disclosure, and not all combinations of features described in the exemplary embodiments are essential to the solving means of the present disclosure. Configurations according to the exemplary embodiments can be appropriately modified or changed depending on specifications and conditions (e.g., use condition and use environment) of an apparatus to which any of the exemplary embodiments is applied. Parts of the exemplary embodiments described below may be appropriately combined with each other. In the following exemplary embodiments, the same components are denoted by the same reference numerals.

Figure 1:
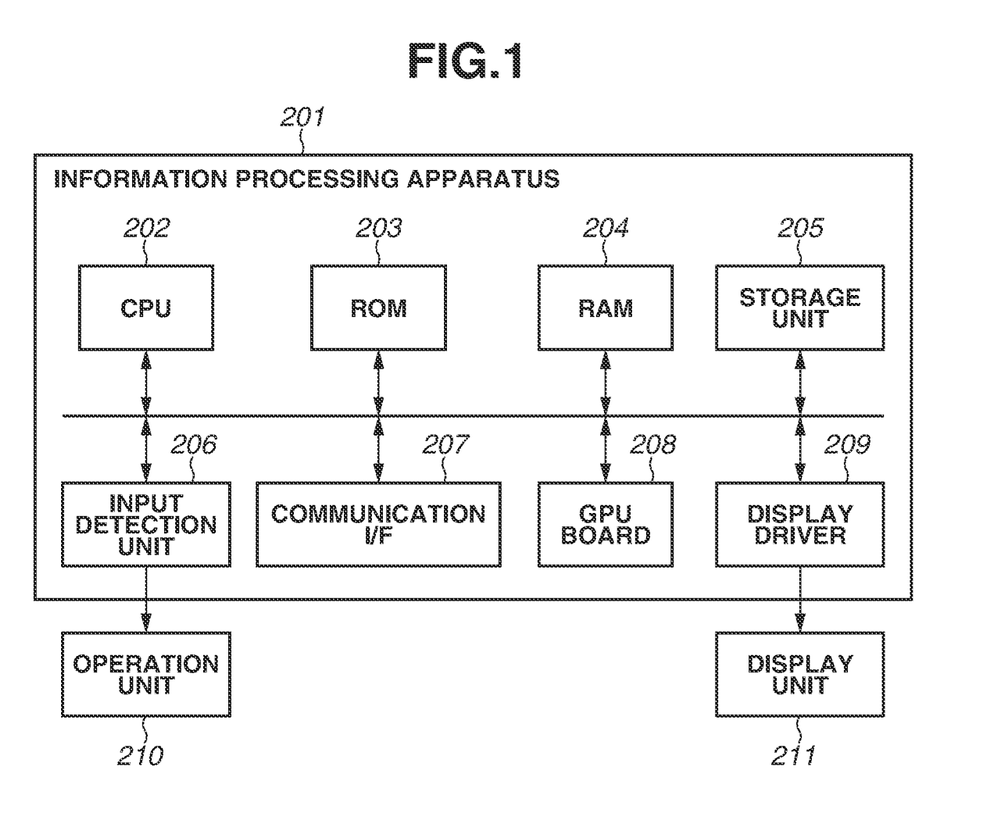
FIG. 1 is a block diagram illustrating an example of a hardware configuration of an information processing apparatus according to a first exemplary embodiment.
Figure 2:
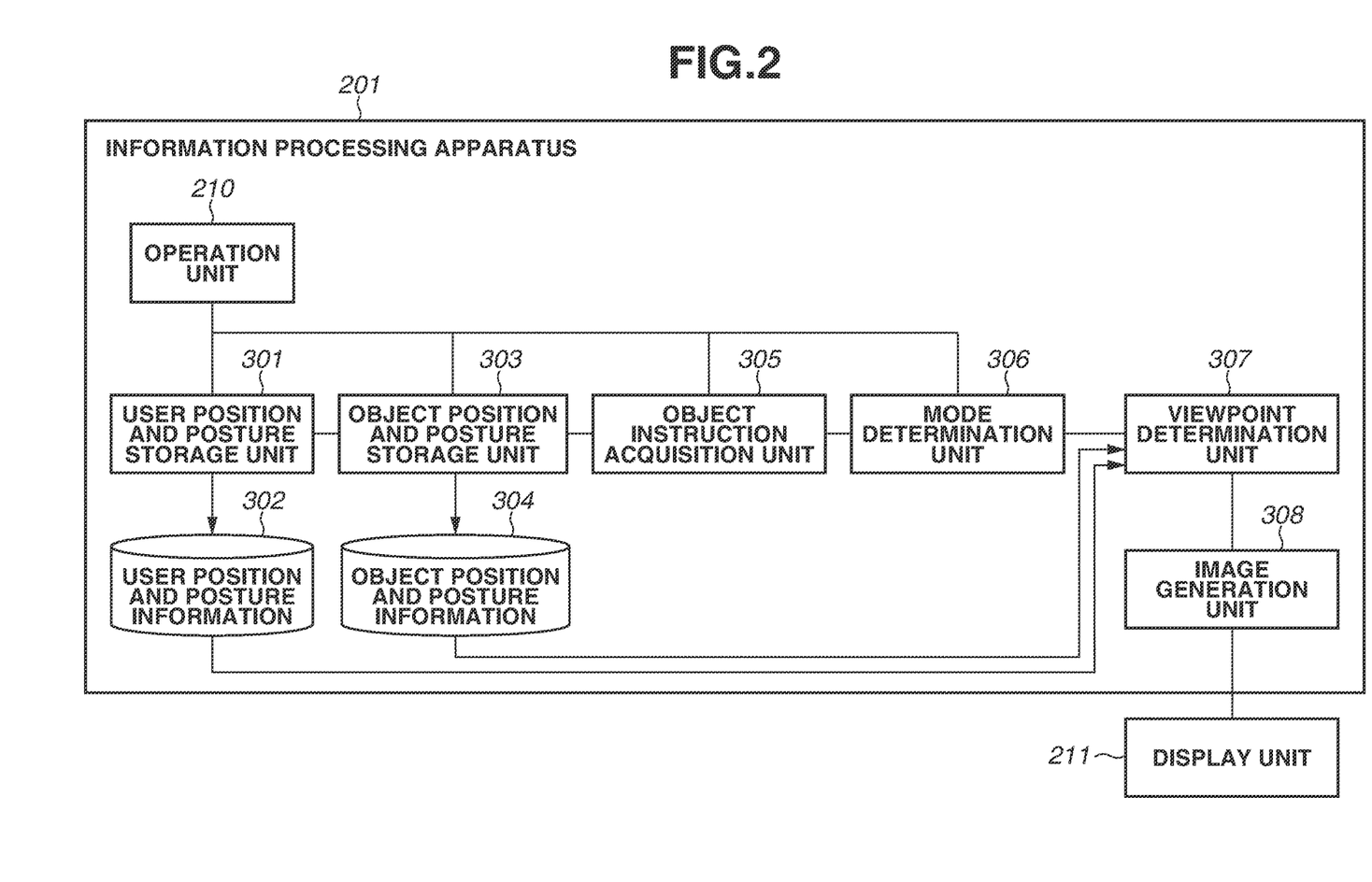
FIG. 2 is a functional block diagram illustrating a functional configuration of the information processing apparatus according to the first exemplary embodiment.

FIG. 1 illustrates an example of a hardware configuration of an information processing apparatus 201 according to a first exemplary embodiment. FIG. 2 is a functional block diagram illustrating a functional configuration of the information processing apparatus 201 according to the present exemplary embodiment. Before the configurations illustrated in FIGS. 1 and 2 are described, a case where a plurality of users uses head mounted displays (HMDs) to view a virtual object disposed in a mixed reality (MR) space at the same time will be described with reference to FIGS. 3 to 5.

As one example thereof, a case will be described where a specific user is a presenter of a presentation and explains an automobile to users who are participants by displaying, on each of the HMDs of the users, a superimposed image in which an image of a virtual object representing the automobile is superimposed on an image of a real space. The participants are the users other than the specific user. While giving the presentation about the automobile, the specific user as the presenter sometimes changes the area or direction that the presenter wants the users as the participants to pay attention to. In this case, with the existing MR technology, the users are to move in the real space or the participants are to move the viewpoint positions in a virtual space of the presenter, and this is not practical. To address the issue, the information processing apparatus 201 according to the present exemplary embodiment performs information processing to be described below.

The information processing apparatus 201 according to the present exemplary embodiment can change, in response to an instruction from a specific user with respect to a virtual object, a viewpoint of another user with respect to the virtual object. In the present exemplary embodiment, the viewpoint with respect to the virtual object includes a position and an orientation (a direction) of the viewpoint. Thus, the information processing apparatus 201 according to the present exemplary embodiment enables a plurality of users to view a virtual object without moving the positions in a real space or moving the viewpoint positions in a virtual space. Furthermore, the information processing apparatus 201 according to the present exemplary embodiment executes a first display mode in which the position and direction of the viewpoint of the specific user are shared among the other users, and a second display mode in which an optimal position and direction of the viewpoint set in advance with respect to the virtual object are shared among the users. In the present exemplary embodiment, the first display mode in which the position and direction of the viewpoint of the specific user are shared among the other users is referred to as a "presenter viewpoint sharing mode". The second display mode in which the optimal position and direction of the viewpoint set in advance with respect to the virtual object are shared among the users is referred to as an "optimal viewpoint sharing mode". In the present exemplary embodiment, the optimal position and direction of the viewpoint set in advance with respect to the virtual object may be shared among the users other than the specific user or shared among all the users including the specific user in the optimal viewpoint sharing mode.

In a case where one of the presenter viewpoint sharing mode and the optimal viewpoint sharing mode is set, the information processing apparatus 201 according to the present exemplary embodiment enables the users to share the viewpoint position and direction with respect to the virtual object based on the set display mode. Whether to use the presenter viewpoint sharing mode or the optimum viewpoint sharing mode as the display mode may be set in advance, or may follow a setting associated with the virtual object to be displayed if not set in advance. Which display mode to use can be optionally determined by, for example, the specific user or the other users operating a mouse, a controller, or the like. In other words, which display mode to use can be optionally determined for each user.

Figure 3:
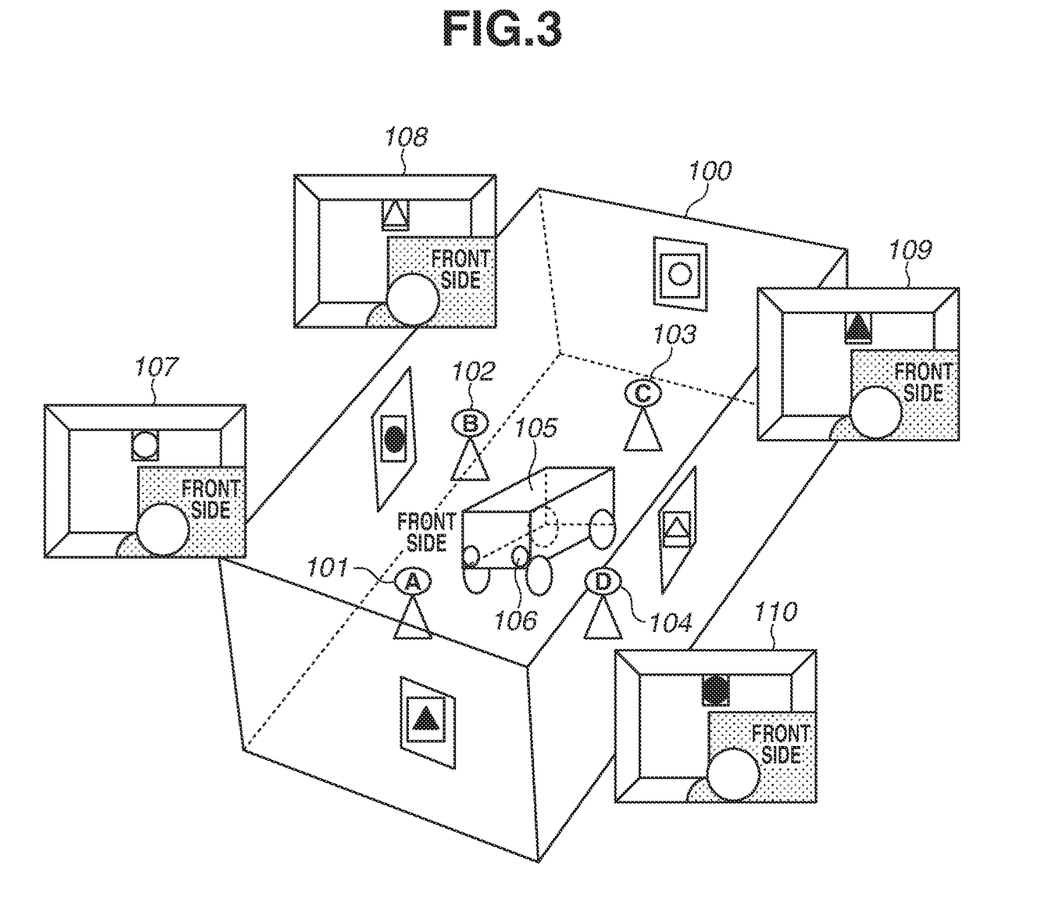
FIG. 3 is a diagram illustrating an example of a mixed reality space according to the first exemplary embodiment.

FIG. 3 illustrates an example in which a plurality of users 101 to 104 (a specific user 101 and other users 102 to 104) is in a real space 100 and a virtual object 105 is disposed in a virtual space corresponding to the real space 100. The virtual object 105 represents a general automobile including two headlights 106. Each of the users 101 to 104 wears the HMD equipped with an image capturing apparatus (a camera). It is assumed that the HMD of each of the users 101 to 104 displays a superimposed image in which the virtual object 105 is superimposed on a real space image that is a captured image of the real space 100. In other words, each of the users 101 to 104 uses the HMD to view the virtual object 105 virtually disposed in the real space 100. FIG. 3 also illustrates images 107 to 110 that are displayed on the HMDs of the users 101 to 104, respectively. The image 107 represents an image displayed on the HMD of the user 101. Similarly, the image 108 represents an image displayed on the HMD of the user 102, the image 109 represents an image displayed on the HMD of the user 103, and the image 110 represents an image displayed on the HMD of the user 104. In the present example, the user 101 is the specific user as the presenter of the presentation, and the other users 102 to 104 are the participants of the presentation.

Suppose that the user 101 (the presenter) indicates the headlights 106 of the virtual object 105 as the area that the presenter wants the users 102 to 104 (the participants) to pay attention to. In this case, the information processing apparatus 201 enables the users 101 to 104 to share the viewpoint position and direction with respect to the virtual object 105 based on the set display mode, i.e., the presenter viewpoint sharing mode or the optimal viewpoint sharing mode.

For example, in the case of the presenter viewpoint sharing mode, the information processing apparatus 201 acquires the viewpoint position and direction of the user 101 (the presenter) with respect to the virtual object 105 in the virtual space. The information processing apparatus 201 then superimposes the virtual object 105 viewed from the viewpoint position and direction of the user 101 on the images of the real space 100 respectively captured by the cameras of the HMDs of the users 102 to 104 (the participants) to generate superimposed images, and displays the generated images on the respective HMDs of the users 102 to 104. Accordingly, each of the HMDs of the users 102 to 104 (the participants) displays the image of the headlights 106 of the virtual object 105 viewed from the viewpoint position and direction of the user 101 (the specific user).

For example, in the case of the optimal viewpoint sharing mode, the information processing apparatus 201 acquires the optimal viewpoint position and direction that are set in advance as the viewpoint position and direction where the headlights 106 of the virtual object 105 are most visible. The information processing apparatus 201 then superimposes the virtual object 105 viewed from the optimal viewpoint position and direction on the images of the real space 100 respectively captured by the cameras of the HMDs of the users 102 to 104 to generate superimposed images, and displays the generated images on the respective HMDs of the users 102 to 104. Accordingly, each of the HMDs of the users 102 to 104 displays the image of the headlights 106 of the virtual object 105 viewed from the optimal viewpoint position and direction. In the optimal viewpoint sharing mode, the optimal viewpoint position and direction with respect to the virtual object 105 do not necessarily have to be shared with the specific user 101, but in the present exemplary embodiment, the optimal viewpoint position and direction are shared with the HMD of the specific user 101 as well. As described above, the information processing apparatus 201 enables the users 101 to 104 to share the viewpoint position and direction with respect to the virtual object 105 based on the set display mode.

Figure 4:
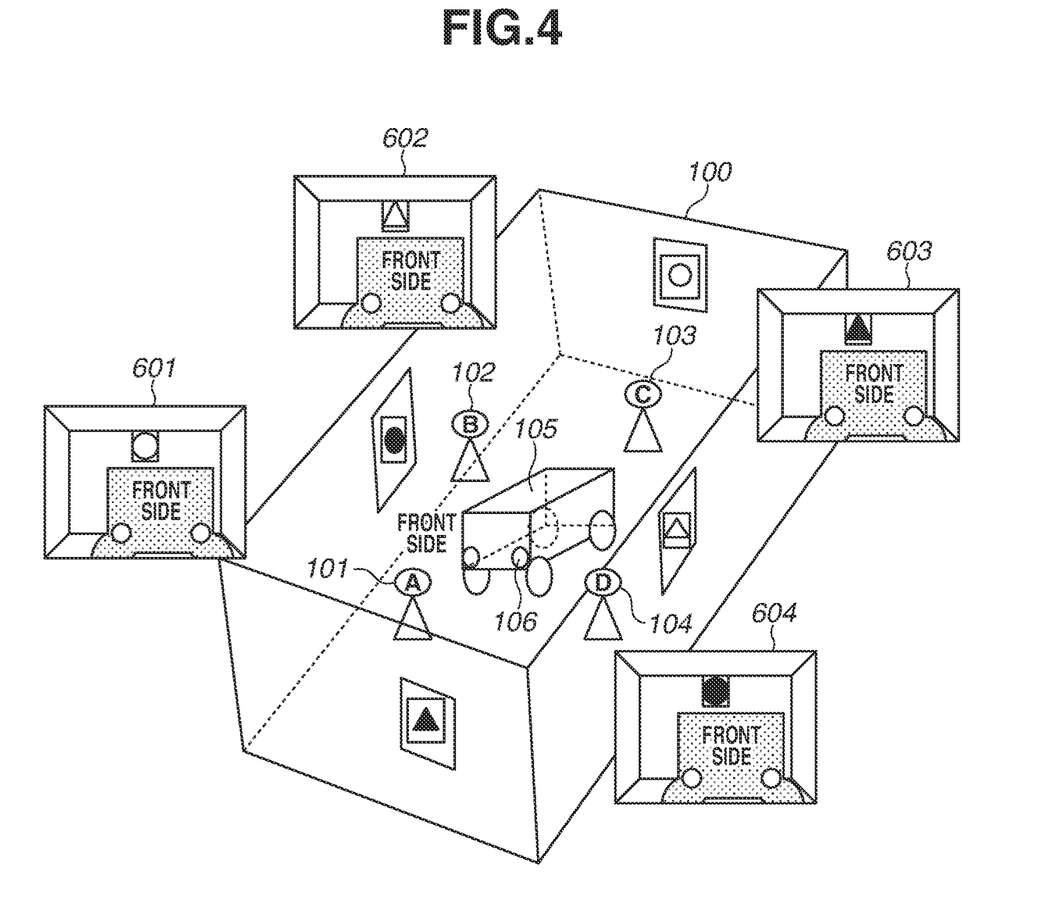
FIG. 4 is a diagram illustrating an example of a presenter viewpoint sharing mode according to the first exemplary embodiment.

FIG. 4 illustrates an example in the case of the presenter viewpoint sharing mode. Images 601 to 604 represent the images displayed on the HMDs of the users 101 to 104 respectively. In the case of the presenter viewpoint sharing mode, if the specific user 101 indicates the headlights 106 of the virtual object 105, the information processing apparatus 201 shares the viewpoint position and direction of the user 101 with respect to the virtual object 105 in the virtual space among the HMDs of the other users 102 to 104. Accordingly, the HMD of each of the users 101 to 104 displays the superimposed image in which the virtual object 105 viewed from the viewpoint position and direction of the specific user 101 (the presenter) is superimposed on the image of the real space 100 viewed from the viewpoint position and direction of the corresponding user in the real space 100.

Figure 5:
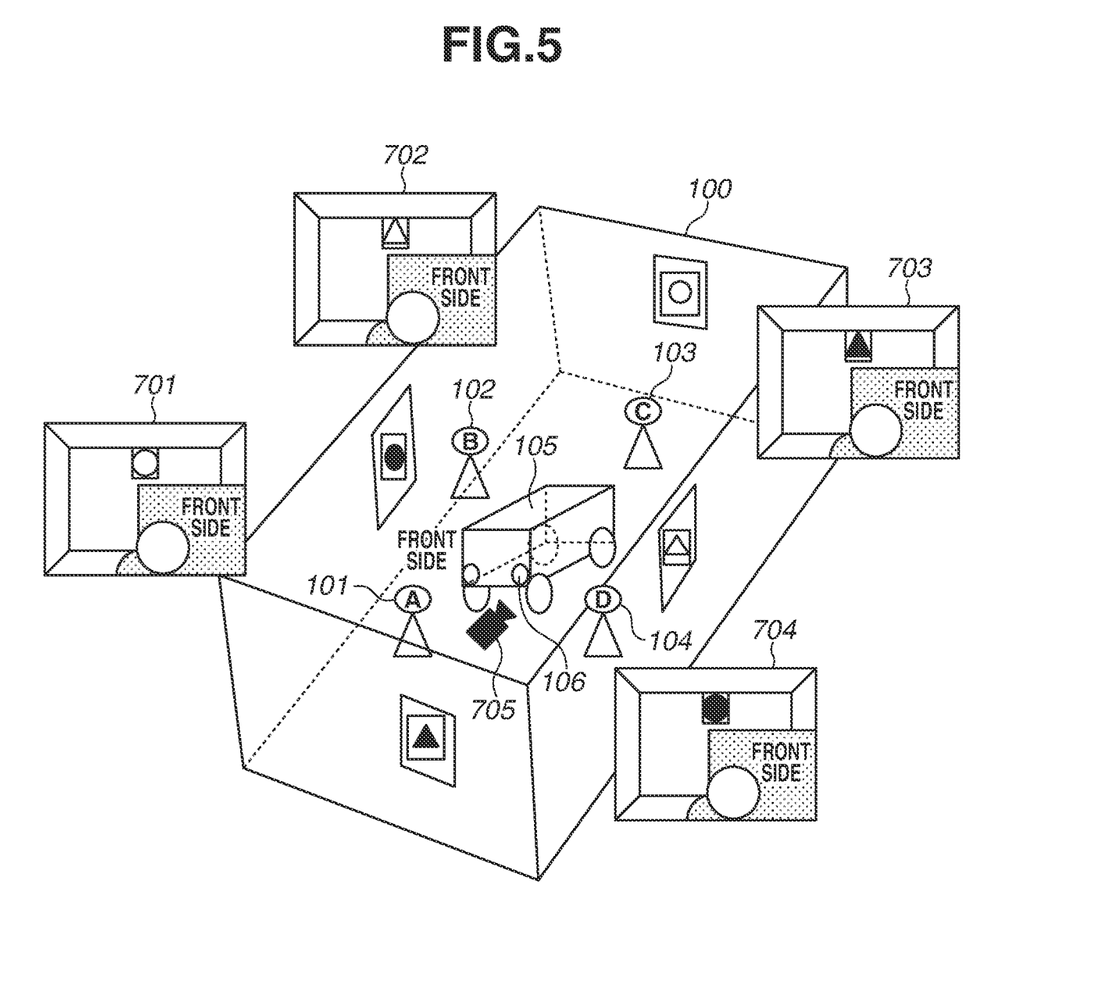
FIG. 5 is a diagram illustrating an example of an optimal viewpoint sharing mode according to the first exemplary embodiment.

FIG. 5 illustrates the optimal viewpoint sharing mode. Images 701 to 704 represent the images displayed on the HMDs of the users 101 to 104, respectively. An optimal viewpoint position 705 indicates the viewpoint position and direction in which the headlights 106 of the virtual object 105 are most visible. When the specific user 101 indicates the headlights 106 of the virtual object 105 in the optimal viewpoint sharing mode, the information processing apparatus 201 shares the optimal viewpoint position 705 with respect to the headlights 106 among the HMDs of the users 101 to 104 in the real space 100.

Accordingly, each of the HMDs of the users 101 to 104 displays the superimposed image in which the virtual object 105 viewed from the optimal viewpoint position 705 and the optimal direction with respect to the headlights 106 is superimposed on the image of the real space 100 viewed from the viewpoint position of the corresponding user in the real space 100.

The configurations and operation of the information processing apparatus 201 according to the present exemplary embodiment will be described next.

FIG. 1 illustrates a configuration of a personal computer (PC) as an example of the hardware configuration of the information processing apparatus 201. The information processing apparatus 201 superimposes the virtual object 105 generated using the computer graphic (CG) technology on the images of the real space 100 respectively captured by the image capturing apparatuses (the cameras) mounted on the HMDs of the users 101 to 104 to generate MR space images, and transmits the MR space images to the respective HMDs. The MR technology is an existing technology, and thus a detailed description thereof will be omitted.

A central processing unit (CPU) 202 is a system control unit and entirely controls the information processing apparatus 201. The CPU 202 executes an information processing program to implement information processing according to the present exemplary embodiment.

A read-only memory (ROM) 203 stores programs and parameters that are not to be changed, such as a basic program and initial data. A random access memory (RAM) 204 temporarily stores input information, calculation results of information processing and image processing, and the like.

An operation unit 210 includes operation devices, such as a keyboard, a mouse, and a controller, that can be used to perform a pointing operation or input various commands, and acquires operation instructions and commands from any of the users 101 to 104. In the present exemplary embodiment, examples of information from the operation unit 210 include instruction information acquired when the specific user 101 inputs an instruction with respect to the virtual object 105. The instruction information acquired when the specific user 101 inputs the instruction with respect to the virtual object 105 is transmitted to an input detection unit 206. The operation unit 210 may have not only a function of acquiring an instruction input using a pointing device but also a function of acquiring an instruction input by voice.

The input detection unit 206 receives an input of required data. In the present exemplary embodiment, examples of the required data include an operation instruction and a command input via the operation unit 210.

A storage unit 205 is a device that enables reading and writing of various information, such as a hard disk or a memory card built in or externally attached to the information processing apparatus 201, or a memory card, a flexible disk, or an integrated circuit (IC) card that can be attached to and detached from the information processing apparatus 201. The information processing program according to the present exemplary embodiment is stored in the storage unit 205. The information processing program is read from the storage unit 205, loaded into the RAM 204, and executed by the CPU 202. The information processing program may be stored in the ROM 203. The storage unit 205 can also store information about an operation instruction input by the specific user 101 via the operation unit 210 and the input detection unit 206, position and posture information about the users 101 to 104 detected by the respective HMDs, and position and posture information about the virtual object 105. Examples of the instruction input by the specific user 101 include an instruction with respect to an area of the virtual object 105 that the specific user 101 wants the other users 102 to 104 to pay attention to and an instruction with respect to any of parts into which the virtual object 105 is divided. In the present exemplary embodiment, the storage unit 205 also stores information about the optimal viewpoint position and orientation (direction) set in advance with respect to the virtual object 105.

A graphics processing unit (GPU) board 208 is a general-purpose graphic board and performs processing such as image generation and composition processing. The GPU board 208 according to the present exemplary embodiment can perform the image generation and composition processing in such a manner that the image of the virtual object 105 generated using the CG technology is superimposed on the image of the real space 100 captured by the camera of the HMD. The image of the virtual object 105 may be generated in advance and stored in the storage unit 205.

A display driver 209 is software for controlling a display unit 211.

The display unit 211 is an electronic display device such as a liquid crystal display device mounted on each of the HMDs of the users 101 to 104. The display unit 211 according to the present exemplary embodiment enables each of the users 101 to 104 to input an instruction using, for example, a mouse cursor (not illustrated) on a display, and also displays an image such as an MR space image generated by the GPU board 208 under control of the CPU 202 based on information in the storage unit 205. The example of FIG. 1 is premised on processing using the PC, and thus the operation unit 210 and the display unit 211 are externally connected to the information processing apparatus 201. In a case where the HMD has an information processing function according to the present exemplary embodiment, the operation unit 210 and the display unit 211 are included in the information processing apparatus 201.

A communication interface (I/F) 207 is an interface unit that can transmit and receive data to and from an operation device, a cloud, or the like. In the present exemplary embodiment, the communication I/F 207 can receive data of the images of the real space 100 captured by the cameras mounted on the HMDs of the users 101 to 104 and the position and posture information detected by the HMDs of the users 101 to 104, via a network.

FIG. 2 is the functional block diagram illustrating the example of the functional configuration of the information processing apparatus 201 according to the present exemplary embodiment.

The information processing apparatus 201 includes, as function modules, the operation unit 210, an object instruction acquisition unit 305, a mode determination unit 306, a viewpoint determination unit 307, an image generation unit 308, and a user position and posture storage unit 301 and an object position and posture storage unit 303 both of which correspond to a position and posture acquisition unit.

The user position and posture storage unit 301 acquires and stores the position and posture of each of the users 101 to 104 in the mixed reality space (the MR space). In the present exemplary embodiment, the user position and posture storage unit 301 acquires information about position coordinates and a line-of-sight vector from each of the HMDs worn by the users 101 to 104 and stores the acquired information as the position and posture information about each of the users 101 to 104 (which is referred to as user position and posture information 302). The user position and posture information 302 is stored, for example, in the storage unit 205.

The object position and posture storage unit 303 acquires and stores the position and posture of the virtual object 105 in the mixed reality space. In the present exemplary embodiment, the object position and posture storage unit 303 acquires information such as the position, orientation, and size of the virtual object 105 in the virtual space and stores the acquired information as object position and posture information 304. The object position and posture information 304 is stored, for example, in the storage unit 205.

The operation unit 210 acquires various instructions and commands, such as a virtual object selection instruction and a display mode switching instruction, from any of the users 101 to 104.

The object instruction acquisition unit 305 acquires information about a user instruction with respect to the virtual object 105 input via the operation unit 210 in the mixed reality space. In the present exemplary embodiment, the object instruction acquisition unit 305 acquires the instruction with respect to the virtual object 105 input by the specific user 101, but can also acquire an instruction input by any of the other users 102 to 104.

The mode determination unit 306 determines whether to use the presenter viewpoint sharing mode or the optimal viewpoint sharing mode as the display mode. In a case where the display mode to be used is set in advance, the mode determination unit 306 determines the display mode based on the setting. In a case where any of the users 101 to 104 inputs an instruction about which display mode to use via the operation unit 210, the mode determination unit 306 determines the display mode based on the input instruction. In a case where the display mode is not set in advance or an instruction about which display mode to use is not input by any of the users 101 to 104, the mode determination unit 306 determines the display mode based on the setting associated with the virtual object 105 to be displayed. In the present exemplary embodiment, the specific user 101 (the presenter) inputs an instruction about which display mode to use, but any of the other users 102 to 104 (the participants) may input the instruction.

The viewpoint determination unit 307 determines the viewpoint with respect to the virtual object 105 in the mixed reality space based on the display mode determined by the mode determination unit 306. In the present exemplary embodiment, the viewpoint determination unit 307 determines the viewpoint position and direction (line-of-sight direction) as the viewpoint with respect to the virtual object 105, based on the user position and posture information 302, the object position and posture information 304, and the display mode determined by the mode determination unit 306. For example, in a case where the display mode is the presenter viewpoint sharing mode, the viewpoint determination unit 307 determines the viewpoint position and direction of the specific user 101 with respect to the virtual object 105 in the virtual space, as the viewpoint position and direction to be shared among the HMDs of the other users 102 to 104. In the case of the optimal viewpoint sharing mode, the viewpoint determination unit 307 determines the optimal viewpoint position and direction set in advance where the headlights 106 of the virtual object 105 are most visible, as the viewpoint position and direction to be shared among the HMDs of the users 101 to 104. The viewpoint determination unit 307 can optionally change the users who share the viewpoint position and direction based on, for example, an instruction input via the operation unit 210.

The image generation unit 308 generates an image of the mixed reality space including the virtual object 105 viewed from the viewpoint determined by the viewpoint determination unit 307. In the present exemplary embodiment, the image generation unit 308 superimposes the image of the virtual object 105 on the images of the real space 100 respectively captured by the cameras of the HMDs of the users 101 to 104 to generate superimposed images, based on the user position and posture information 302, the object position and posture information 304, and the viewpoint position and direction determined by the viewpoint determination unit 307. The image generation unit 308 then transmits the images of the real space 100 with the virtual object 105 superimposed thereon to the respective HMDs of the users 101 to 104. Accordingly, the HMD of each of the users 101 to 104 displays the superimposed image in which the virtual object 105 is superimposed on the image of the real space 100. More specifically, in the case of the presenter viewpoint sharing mode, each of the HMDs of the other users 102 to 104 displays the superimposed image in which the virtual object 105 viewed from the viewpoint position and direction of the specific user 101 is superimposed on the image of the real space 100 captured by the camera of the HMD of the corresponding user. In the case of the optimal viewpoint sharing mode, each of the HMDs of the users 101 to 104 displays the superimposed image in which the virtual object 105 viewed from the optimal viewpoint position and direction set in advance is superimposed on the image of the real space 100 captured by the camera of the HMD of the corresponding user.

Figure 6:
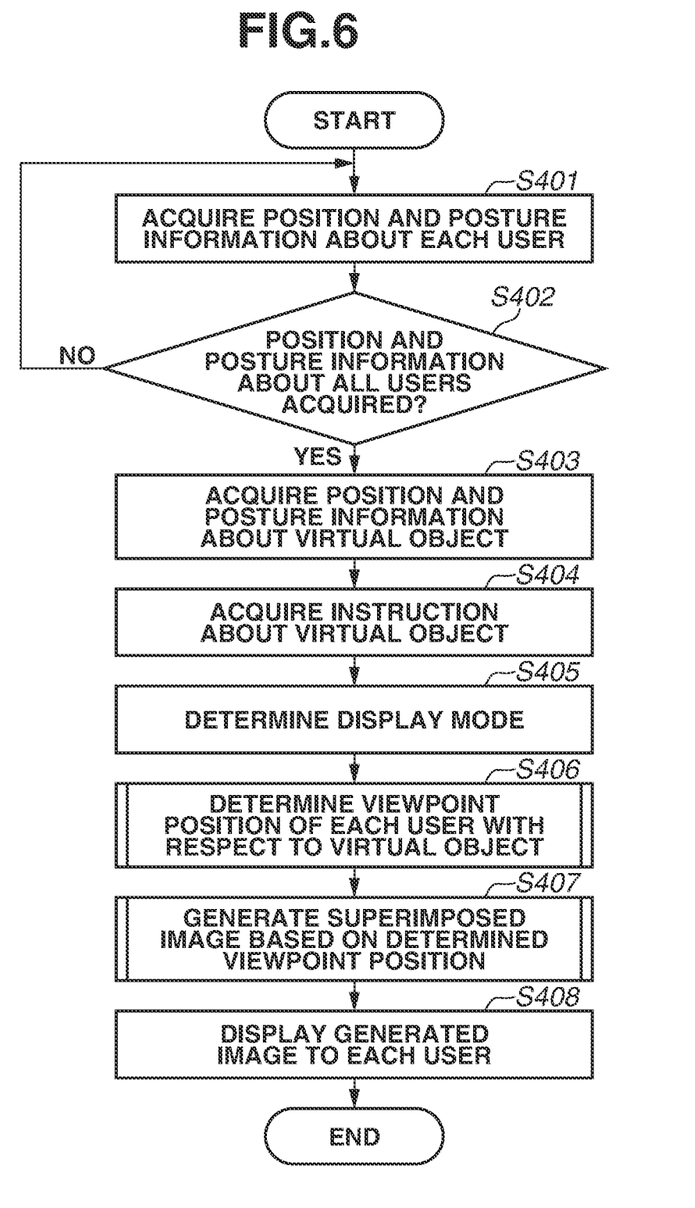
FIG. 6 is a flowchart illustrating a procedure of information processing according to the first exemplary embodiment.

FIG. 6 is a flowchart illustrating a procedure of the information processing performed by the information processing apparatus 201.

The processing in the flowchart is implemented by the CPU 202 executing the information processing program according to the present exemplary embodiment.

In step S401, the user position and posture storage unit 301 analyzes the real space image acquired by the camera (the image capturing apparatus) mounted on the HMD of each of the users 101 to 104, using an existing self-position estimation technique, and acquires the position and posture information about each of the users 101 to 104. In the present exemplary embodiment, the position and posture information about each of the users 101 to 104 is the position and posture of the HMD, and the position and posture of the HMD is information that can represent the viewpoint position and direction of the corresponding user. Examples of the self-position estimation method include simultaneous localization and mapping (SLAM). The method is not limited to SLAM as long as the method can acquire the position and posture of each of the users 101 to 104 (the position and posture of the HMD) in the real space 100. The position and posture of each of the users 101 to 104 may be acquired using, for example, a Global Positioning System (GPS), a gyro sensor, or a geomagnetic sensor. The user position and posture storage unit 301 stores the information acquired in step S401 as the user position and posture information 302.

In step S402, the user position and posture storage unit 301 determines whether the position and posture information about all the users 101 to 104 in the mixed reality space is acquired. In a case where the acquisition of the position and posture information about all the users 101 to 104 (the viewpoint positions and directions of all the users 101 to 104) is not completed (NO in step S402), the processing returns to step S401 to acquire the position and posture information about any of the users 101 to 104 not yet acquired. On the other hand, in a case where the acquisition is completed (YES in step S402), the processing proceeds to step S403.

In step S403, the object position and posture storage unit 303 acquires the position and posture information about the virtual object 105 (the viewpoint position and direction of the virtual object 105). In the present exemplary embodiment, since the specific user 101 is the presenter, the storage unit 205 stores the superimposed image in which the virtual object 105 is superimposed on the image of the real space 100 captured by the camera of the HMD of the presenter. The object position and posture storage unit 303 loads the superimposed image from the storage unit 205 into the RAM 204 and acquires, from the superimposed image, the position and posture information about the virtual object 105 in the virtual space that is selected by the presenter via the operation unit 210. Then, the object position and posture storage unit 303 stores the acquired information as the object position and posture information 304.

In step S404, the object instruction acquisition unit 305 acquires an instruction with respect to the virtual object 105 from the specific user 101 (the presenter) based on an operation input via the operation unit 210. The instruction from the presenter may be input by voice instead of being input via the operation unit 210.

In step S405, the mode determination unit 306 determines whether to use the presenter viewpoint sharing mode or the optimal viewpoint sharing mode as the display mode of the virtual object 105 of which notification is received from the object instruction acquisition unit 305.

In step S406, the viewpoint determination unit 307 determines the viewpoint position and direction of each of the users 101 to 104 with respect to the virtual object 105, based on the user position and posture information 302, the object position and posture information 304, and the display mode determined by the mode determination unit 306. Display viewpoint determination processing by the viewpoint determination unit 307 will be described in detail below with reference to a flowchart illustrated in FIG. 7.

In step S407, the image generation unit 308 superimposes the virtual object 105 on the respective real space images to generate superimposed images, based on the viewpoint position and direction determined by the viewpoint determination unit 307, the user position and posture information 302, and the object position and posture information 304. Superimposed image generation processing by the image generation unit 308 will be described in detail below with reference to the flowchart illustrated in FIG. 7.

In step S408, the display unit 211 displays, on the HMD of each of the users 101 to 104, the superimposed image in which the virtual object 105 is superimposed on the corresponding real space image.

Figure 7:
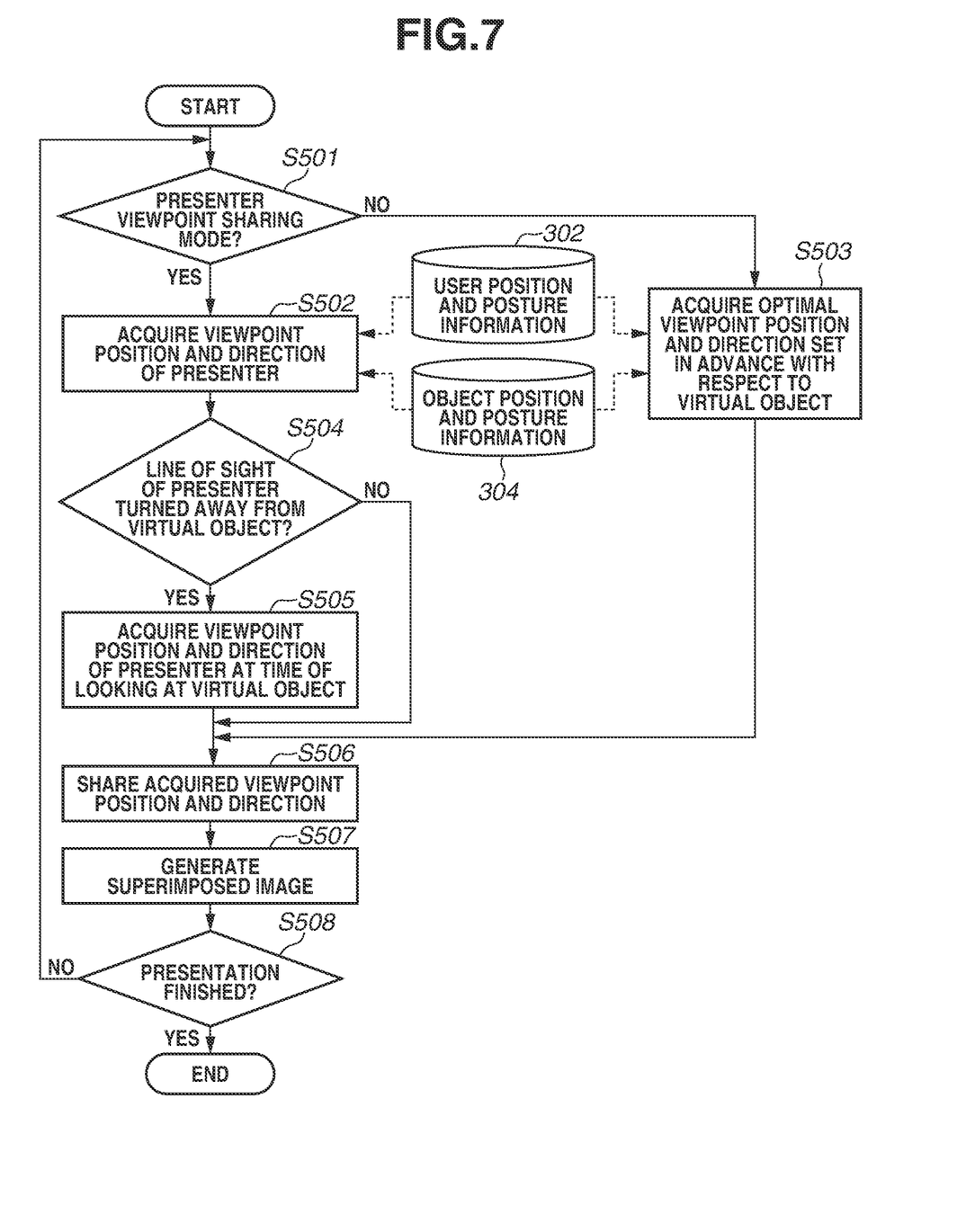
FIG. 7 is a flowchart illustrating viewpoint determination processing and image generation processing according to the first exemplary embodiment.

FIG. 7 is the flowchart illustrating a procedure of the display viewpoint determination processing performed by the viewpoint determination unit 307 in step S406 and the superimposed image generation processing performed by the image generation unit 308 in step S407. Processing in steps S501 to S506 corresponds to the processing in step S406, and processing in steps S507 and S508 corresponds to the processing in step S407.

In step S501, the viewpoint determination unit 307 determines whether the display mode determined in step S405 is the presenter viewpoint sharing mode or the optimal viewpoint sharing mode. In a case where the viewpoint determination unit 307 determines that the display mode is the presenter viewpoint sharing mode (YES in step S501), the processing proceeds to step S502. In a case where the viewpoint determination unit 307 determines that the display mode is the optimal viewpoint sharing mode (NO in step S501), the processing proceeds to step S503.

In step S502, the viewpoint determination unit 307 acquires the viewpoint position and direction of the specific user 101 (the presenter) based on the user position and posture information 302 and the object position and posture information 304. The processing then proceeds to step S504.

In step S504, the viewpoint determination unit 307 determines whether the line of sight of the specific user 101 (the presenter) is turned away from the target virtual object (the virtual object 105). In a case where the viewpoint determination unit 307 determines that the line of sight of the presenter is not turned away from the target virtual object (NO in step S504), the processing proceeds to step S506. In step S506, the viewpoint determination unit 307 shares the acquired viewpoint position and direction among the HMDs of the other users 102 to 104.

On the other hand, in a case where the viewpoint determination unit 307 determines that the line of sight of the presenter is turned away from the target virtual object (YES in step S504), the processing proceeds to step S505. More specifically, for example, in a case where the presenter explains the headlights 106 of the virtual object 105 while pointing at the headlights 106 with a pointer, the presenter sometimes turn the line of sight away from the virtual object 105 to read an explanatory note. If the viewpoint position and direction of the presenter at this time are shared among the other users 102 to 104, the lines of sight of the other users 102 to 104 are also turned away from the virtual object 105. In other words, the displays on the HMDs of the other users 102 to 104 are also turned away from the virtual object 105. Thus, in a case where the viewpoint determination unit 307 determines that the line of sight of the presenter is turned away from the target virtual object (YES in step S504), the processing proceeds to step S505.

In step S505, the viewpoint determination unit 307 acquires the viewpoint position and direction of the presenter at the time of looking at the virtual object 105, and the processing proceeds to step S506. More specifically, in this case, in step S506, the viewpoint determination unit 307 shares the viewpoint position and direction of the presenter at the time of looking at the virtual object 105 among the HMDs of the other users 102 to 104. Alternatively, in step S505, the viewpoint determination unit 307 may share the viewpoint position and direction set in advance with respect to the virtual object 105 among the HMDs of the other users 102 to 104.

On the other hand, in a case where the processing proceeds from step S501 to step S503, the viewpoint determination unit 307 acquires the optimal viewpoint position and direction set in advance with respect to the virtual object 105, and the processing proceeds to step S506. In step S506, the viewpoint determination unit 307 shares the optimal viewpoint position and direction among the HMDs of the other users 102 to 104.

After the processing in step S506, the processing proceeds to step S507 in which processing is performed by the image generation unit 308. In step S507, the image generation unit 308 generates superimposed images based on the viewpoint position and direction shared among the other users 102 to 104 in step S506. The superimposed images may be generated on the respective HMDs, or the superimposed images generated by another component may be transmitted to the respective HMDs.

In step S508, the information processing apparatus 201 determines whether the specific user 101 (the presenter) finishes the presentation. In a case where the presentation is finished (YES in step S508), the image generation unit 308 transmits an image or a message indicating that the presentation is finished, to the display unit 211. On the other hand, in a case where the presentation is not finished (NO in step S508), the information processing apparatus 201 repeats the processing in steps S501 to S507 until the presentation is finished. While the processing in steps S501 to S507 in FIG. 7 is repeated during the presentation, the display mode can be optionally switched.

In the first exemplary embodiment described above, superimposed images are generated by sharing the viewpoint position and direction of the specific user 101 with respect to the virtual object 105 or the optimal viewpoint position and direction with respect to the virtual object 105 set in advance, and then displayed on the respective HMDs of the other users 102 to 104. For example, in a case where the plurality of users 101 to 104 surrounds and views the virtual object 105 in the MR space, the users 101 to 104 may desire to discuss the virtual object 105 while viewing the virtual object 105 at different positions from each other. Thus, in a second exemplary embodiment, an example will be described in which different viewpoint positions and directions are calculated for the respective users 102 to 104 with respect to the virtual object 105, and superimposed images generated based on the different viewpoint positions and directions are displayed on the respective HMDs of the users 102 to 104.

Figure 8A:
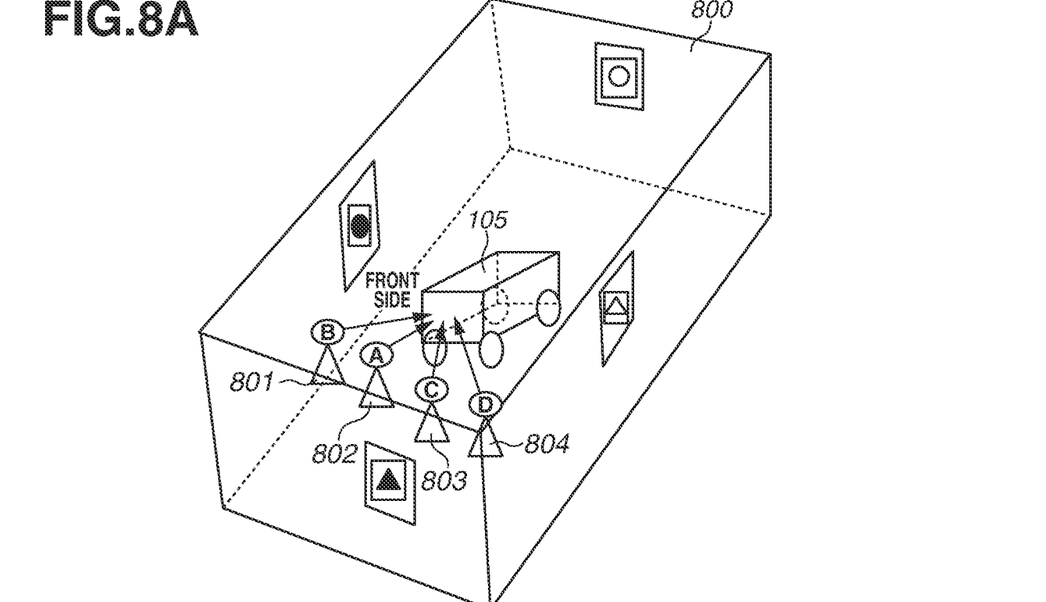
FIGS. 8A and 8B are diagrams illustrating an example of a mixed reality space according to a second exemplary embodiment.
Figure 8B:
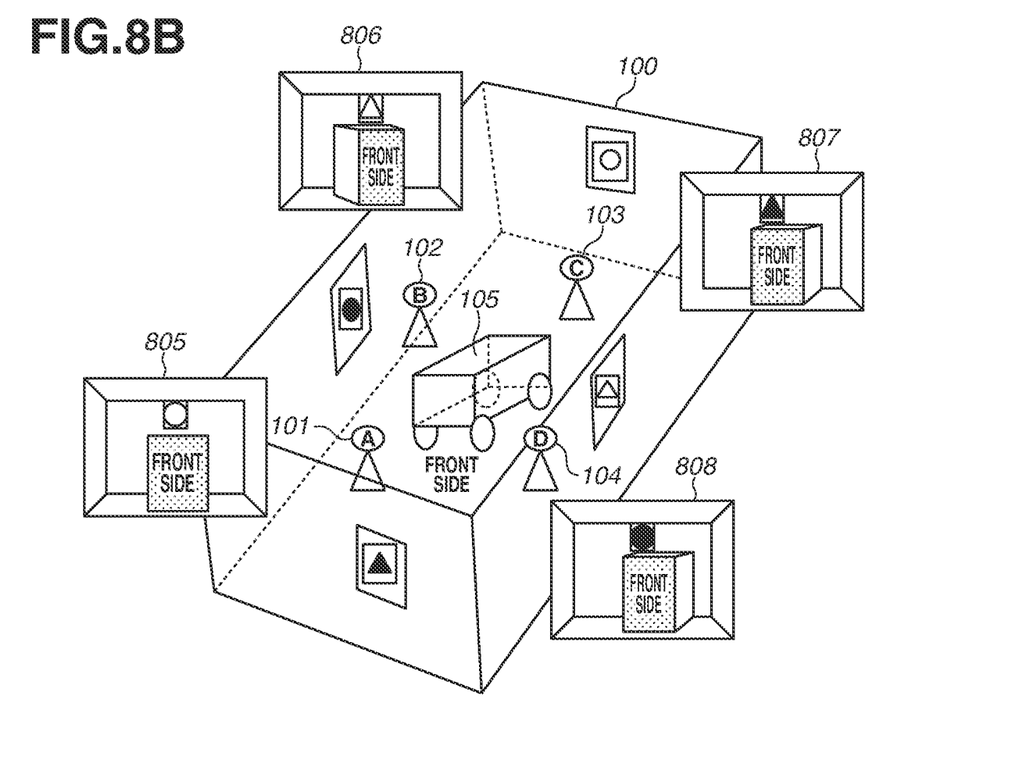

FIGS. 8A and 8B illustrate an example in which different viewpoint positions and directions are calculated for the other users 102 to 104 by using the viewpoint position and direction of the specific user 101 (the presenter) as a reference.

FIG. 8A illustrates viewpoint positions and directions of users 801 to 804 (a specific user 802 and other users 801, 803, and 804) in a virtual space 800. In the example of FIG. 8A, the user 802 corresponds to the specific user and the viewpoint position and direction of the user 802 with respect to the virtual object 105 in the virtual space 800 are used as the reference. In the virtual space 800, the users 801 to 804 are disposed in a predetermined arrangement such as a side-by-side arrangement or a fan shape arrangement, and the viewpoint positions and directions of the other users 801, 803, and 804 disposed in the predetermined arrangement are respectively calculated based on the viewpoint position and direction of the specific user 802 serving as the reference. While in the present exemplary embodiment, the example in which the viewpoint position and direction of the specific user 802 is used as the reference, the viewpoint position and direction serving as the reference may be the viewpoint position and direction of any of the users 801 to 804 selected or the viewpoint position and direction set in advance with respect to the virtual object 105.

FIG. 8B illustrates the users 101 to 104 in the real space 100 and the virtual object 105 in the virtual space in the mixed reality space according to the present exemplary embodiment. Images 805 to 808 illustrated in FIG. 8B represent the superimposed images to be displayed on the respective HMDs of the users 101 to 104 according to the present exemplary embodiment.

In the present exemplary embodiment, each of the HMDs of the users 101 to 104 displays the superimposed image in which the virtual object 105 viewed from a corresponding one of the viewpoint positions and directions of the users 801 to 804 disposed in the virtual space 800 illustrated in FIG. 8A is superimposed on the image of the real space 100 captured by the camera thereof. More specifically, in the present exemplary embodiment, the users 101 to 104 can discuss the virtual object 105 as if viewing the virtual object 105 at different positions, such as those of the users 801 to 804 in the virtual space 800, while keeping the standing positions in the real space 100. Furthermore, in the present exemplary embodiment, each of the users 101 to 104 can independently perform various operations, such as enlargement, reduction, and rotation operations, via the operation unit 210, for the superimposed image displayed on the corresponding HMD.

Figure 9:
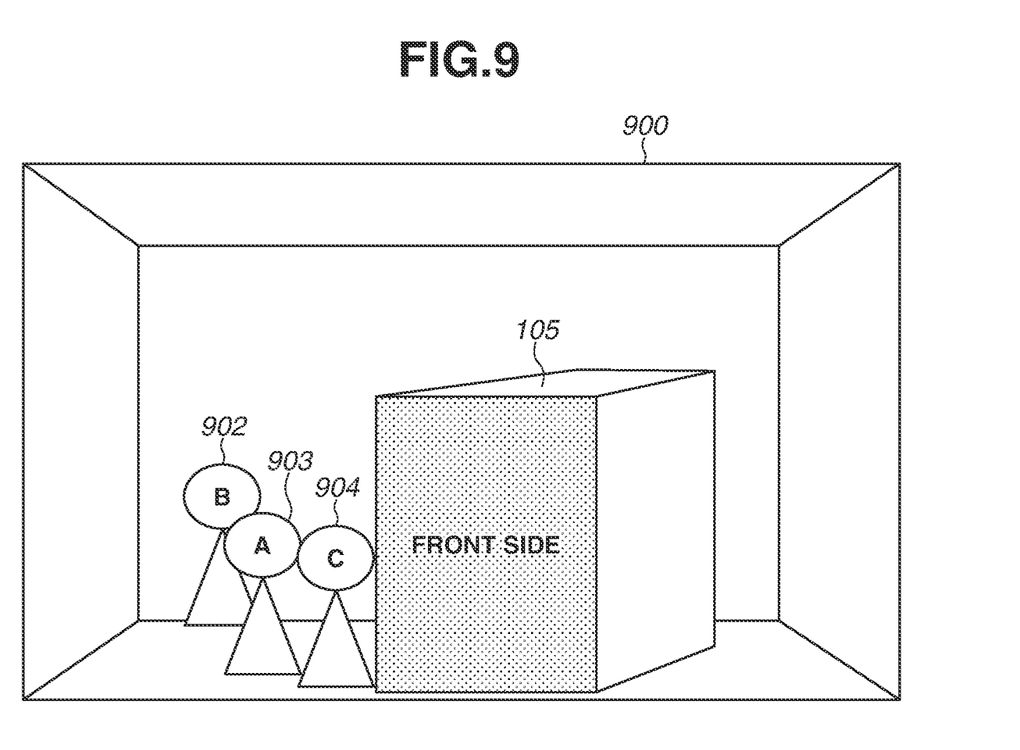
FIG. 9 is a diagram illustrating an example of arrangement of avatars according to the second exemplary embodiment.

FIG. 9 illustrates an example in which avatars 902, 903, and 904 of the respective users (e.g., the users 801, 802, and 803) in the virtual space 800 illustrated in FIG. 8A are displayed while superimposed on a real space image according to the present exemplary embodiment. An image 900 represents an image displayed on, for example, the HMD of the user 104.

In the example of FIG. 9, the image generation unit 308 generates the image 900 by arranging and superimposing the avatars 902 to 904 of the other users 101 to 103 on the image to be displayed on the HMD of the user 104, based on the viewpoint positions and directions of the users 801 to 804 in the virtual space 800. Accordingly, even if the users 101 to 104 are located away from each other in the real space 100, it is possible to make the users 101 to 104 feel as if the users 101 to 104 are next to each other and discuss the virtual object 105 in the virtual space.

Such avatars described above may be superimposed on the image generated corresponding to the viewpoint determined by the viewpoint determination unit 307 for each of the users 101 to 104 according to the above-described first exemplary embodiment. The avatars in this case are generated by the image generation unit 308 according to the first exemplary embodiment.

Figure 10:
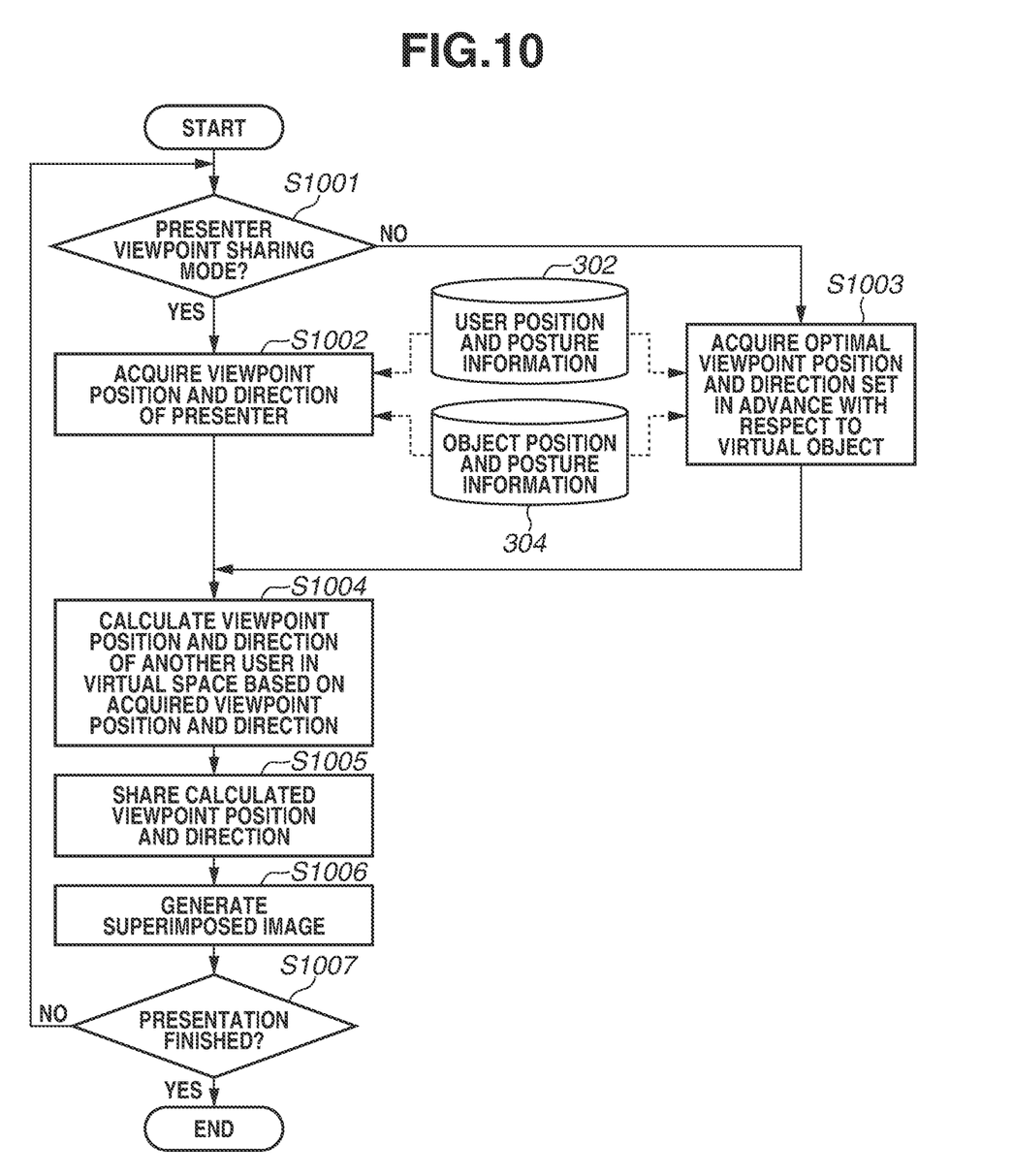
FIG. 10 is a flowchart illustrating viewpoint determination processing and image generation processing according to the second exemplary embodiment.

FIG. 10 is a flowchart illustrating a procedure of the display viewpoint determination processing performed by the viewpoint determination unit 307 in step S406 and the superimposed image generation processing performed by the image generation unit 308 in step S407 in FIG. 6 according to the present exemplary embodiment. In steps S1001 to 1003, processing for determining whether to share the viewpoint position and direction of the presenter among the other users 102 to 104 and acquiring the viewpoint position and direction based on the determination result is performed similarly to the processing in steps S501 to S503 in FIG. 7.

In the present exemplary embodiment, in step S1002, the viewpoint determination unit 307 acquires the viewpoint position and direction of the presenter (the specific user 101) from the user position and posture information 302 and the object position and posture information 304, and then the processing proceeds to step S1004.

In step S1004, the viewpoint determination unit 307 calculates the viewpoint position and direction of each of the users 102 to 104 in the virtual space, based on the viewpoint position and direction acquired in step S1002 or S1003. In the present exemplary embodiment, the viewpoint determination unit 307 calculates the viewpoint position and direction of each of the users 102 to 104 assuming that the users 101 to 104 are disposed in a predetermined arrangement, such as a side-by-side arrangement or a fan shape arrangement, with respect to the target virtual object (the virtual object 105). Accordingly, each of the users 102 to 104 can view the virtual object 105 from a different angle.

After the processing in step S1004, in step S1005, the viewpoint determination unit 307 shares the viewpoint position and direction of each of the users 102 to 104 with respect to the virtual object 105 in the virtual space, which is calculated in step S1004, with the HMD of the corresponding user.

In step S1006, the image generation unit 308 generates the superimposed image based on the viewpoint position and direction shared with each of the user 102 to 104, similarly to the processing in step S507 according to the first exemplary embodiment. The superimposed image in which the virtual object 105 is superimposed on the real space image may be generated on the HMD, or may be generated by another component and transmitted to the HMD. In a case where the superimposed image is generated by the HMD of each of the users 102 to 104, avatars may be generated based on the viewpoint positions of the other users in the virtual space and then disposed in a field of view at the same time as described above with reference to FIG. 9. Accordingly, the discussion among the users 101 to 104 can be made more realistic.

After the processing in step S1006, in step S1007, the information processing apparatus 201 determines whether the presentation is finished, similarly to the processing in step S508. In a case where the presentation is finished (YES in step S1007), the image generation unit 308 transmits a notification that the presentation is finished, to the display unit 211. In a case where the presentation is not finished (NO in step S1007), the information processing apparatus 201 repeats the processing in steps S1001 to S1006 until the presentation is finished. Also in the present exemplary embodiment, the display mode can be optionally switched in a period during which the processing in steps S1001 to S1007 is repeated.

As described above, the information processing apparatus 201 according to each of the first and second exemplary embodiments enables the other users 102 to 104 to change and share the viewpoint position and direction with respect to the virtual object 105 in response to an instruction with respect to the virtual object 105 from the specific user 101 such as the presenter. Furthermore, the information processing apparatus 201 according to each of the first and second exemplary embodiments enables any of the users 101 to 104 to optionally switch the display mode of the virtual object 105, so that the specific user 101 can clearly share the area that the specific user 101 wants the other users 102 to 104 to pay attention to, with the other users 102 to 104.

While in the above-described exemplary embodiments, the example of the mixed reality space where a plurality of users gathers in the same real space to view a virtual object has been described, the plurality of users may be located away from each other in different real spaces. In this case, it is conceivable that each of the exemplary embodiments is applied to a system in which the HMDs of the users or personal computers connected to the HMDs are connected to each other via the Internet, and the users can exchange the images and sounds acquired by the cameras of the HMDs via a server and communicate with each other. Each of the HMDs of the users who are in different real spaces displays the superimposed image in which the virtual object is superimposed on the captured image of the corresponding real space. Accordingly, the plurality of users located away from each other can view the virtual object via the network. At this time, based on the display mode set to the presenter viewpoint sharing mode or the optimal viewpoint sharing mode and an instruction with respect to the virtual object from a specific user, the other users can share the viewpoint position and direction with respect to the virtual object.

While in the above-described exemplary embodiments, the example in which each user wears the HMD to view a superimposed image in which a virtual object is superimposed on a real space image has been described, the mobile terminal used by each user is not limited to the HMD and may be a smartphone or a tablet terminal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-133964, filed Aug. 19, 2021, which is hereby incorporated by reference herein in its entirety.

What is claimed is:

1. An information processing system comprising a plurality of head mounted displays (HMD) and an information processing apparatus, the information processing system comprising:
at least one memory storing instructions; and
at least one processor that, upon execution of the instructions, is configured to operate as:
an instruction acquisition unit configured to acquire an instruction from a first user who wears a first HMD;

a mode determination unit configured to determine, based on the acquired instruction, a display mode of a second HMD worn by a second user;

a viewpoint determination unit configured to determine, based on the determined display mode, a viewpoint with respect to a virtual object in a mixed reality space; and an image generation unit configured to generate an image of the mixed reality space, wherein the image generation unit generates an image in which an image of the virtual object viewed from the determined viewpoint different from the viewpoint of the second user is superimposed on an image of the real space obtained by the second HMD, as the image of the mixed reality space displayed on the second HMD.

2. The information processing apparatus according to claim 1, wherein execution of the instructions further configures the at least one processor to operate as a position and posture acquisition unit configured to acquire a position and a posture of the virtual object and positions and postures of the first user and the second user in the mixed reality space, wherein the viewpoint determination unit determines the viewpoint with respect to the virtual object corresponding to the display mode, based on the position and posture of the virtual object, the position and posture of each of the first user and the second user, and the instruction with respect to the virtual object, and wherein the image generation unit generates an image in which an image of the virtual object viewed from the determined viewpoint is superimposed on an image of a real space obtained for each of the first user and the second user, as the image of the mixed reality space.

3. The information processing apparatus according to claim 2, wherein the mode determination unit determines whether to use a first display mode in which a viewpoint of a specific user, among the first and second users, with respect to the virtual object is determined as a viewpoint of a user, other than the specific user, with respect to the virtual object or a second display mode in which a viewpoint set in advance with respect to the virtual object is determined as the viewpoint of the other user with respect to the virtual object.

4. The information processing apparatus according to claim 3, wherein, in a case where the mode determination unit determines to use the first display mode, the viewpoint determination unit determines a position and a direction of the viewpoint of the specific user with respect to the virtual object, as a position and a direction of the viewpoint of the other user with respect to the virtual object.

5. The information processing apparatus according to claim 4, wherein, in a case where a line of sight of the specific user is turned away from the virtual object, the viewpoint determination unit determines a position and a direction of the viewpoint of the specific user at a time of looking at the virtual object, as the position and the direction of the viewpoint with respect to the virtual object.

6. The information processing apparatus according to claim 4, wherein, in a case where a line of sight of the specific user is turned away from the virtual object, the viewpoint determination unit determines a position and a direction of the viewpoint set in advance, as the position and the direction of the viewpoint with respect to the virtual object.

7. The information processing apparatus according to claim 3, wherein, in a case where the mode determination unit determines to use the second display mode, the viewpoint determination unit determines a position and a direction of the viewpoint set in advance with respect to the virtual object, as a position and a direction of a viewpoint of at least the other user with respect to the virtual object.

8. The information processing apparatus according to claim 3, wherein the mode determination unit determines the display mode by switching between the first display mode and the second display mode based on an instruction from the specific user.

9. The information processing apparatus according to claim 3, wherein the mode determination unit determines whether to use the first display mode or the second display mode, for each of the plurality of users.

10. The information processing apparatus according to claim 1, wherein the viewpoint determination unit determines a position and a direction of a viewpoint in a predetermined arrangement with respect to the virtual object, as the viewpoint with respect to the virtual object.

11. The information processing apparatus according to claim 10, wherein the viewpoint determination unit determines each of positions and directions of a plurality of viewpoints in the predetermined arrangement with respect to the virtual object, as the viewpoint with respect to the virtual object, based on a position and a direction of a viewpoint serving as a reference.

12. The information processing apparatus according to claim 11, wherein the position and the direction of the viewpoint serving as the reference is a position and a direction of a viewpoint of a user, among the plurality of users, serving as the reference or a position and a direction of the viewpoint set in advance.

13. The information processing apparatus according to claim 1, wherein the image generation unit generates an image in which avatars of the plurality of users are superimposed on the image of the mixed reality space, based on positions and directions of viewpoints of the plurality of users in the mixed reality space.

14. The information processing apparatus according to claim 1, further comprising an operation unit configured to enable the user to perform an independent operation with respect to the virtual object.

15. The information processing apparatus according to claim 1, wherein the image of the mixed reality space generated by the image generation unit is displayed on a mobile terminal held by the user.

16. The information processing apparatus according to claim 15, wherein the mobile terminal includes a head mounted display worn by the user.

17. An information processing method performed by an information processing system that includes a plurality of head mounted displays (HMD) and an information processing apparatus, the method comprising:

acquiring an instruction from a first user who wears a first HMD;

determining, based on the acquired instruction, a display mode of a second HMD worn by a second user in;

determining, based on the determined display mode, a viewpoint with respect to a virtual object in a mixed reality space; and generating an image of the mixed reality space including an image in which an image of the virtual object viewed from the determined viewpoint different from the viewpoint of the second user is superimposed on an image of the real space obtained by the second HMD, as the image of the mixed reality space displayed on the second HMD.

18. A non-transitory computer-readable storage medium storing a program for causing a computer to execute an information processing method performed by an information processing system that includes a plurality of head mounted displays (HMD) and an information processing apparatus, the method comprising:
- acquiring an instruction from a first user who wears a first HMD;
- determining, based on the acquired instruction, a display mode of a second HMD worn by a second user;
- determining, based on the determined display mode, a viewpoint with respect to a virtual object in a mixed reality space; and
- generating an image of the mixed reality space including an image in which an image of the virtual object viewed from the determined viewpoint different from the viewpoint of the second user is superimposed on an image of the real space obtained by the second HMD, as the image of the mixed reality space displayed on the second HMD.

* * * * *